(12) United States Patent
Glass et al.

(10) Patent No.: US 6,568,219 B1
(45) Date of Patent: May 27, 2003

(54) SRO + BAO + NB$_2$O$_5$ + TEO$_2$ CERAM-GLASS ELECTRO-OPTICAL DEVICE AND METHOD OF MAKING

(75) Inventors: Alastair Malcolm Glass, Rumson, NJ (US); Benjamin Irvin Greene, Westfield, NJ (US); Nonna Kopylov, Scotch Plains, NJ (US); Ahmet Refik Kortan, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 180 days.

(21) Appl. No.: 09/629,757

(22) Filed: Jul. 31, 2000

(51) Int. Cl.$^7$ .............................................. C03B 37/027
(52) U.S. Cl. ............................ 65/386; 65/391; 65/33.1; 385/130; 385/2; 385/141; 501/10; 501/41; 501/135; 501/137; 501/37
(58) Field of Search ................... 65/386, 391, 33.1; 385/130, 2, 141; 501/10, 41, 135, 137, 37

(56) References Cited

U.S. PATENT DOCUMENTS

| | | | | |
|---|---|---|---|---|
| 3,877,953 A | * | 4/1975 | Broemer et al. | 501/75 |
| 4,732,875 A | * | 3/1988 | Sagara | 501/42 |
| 5,116,786 A | * | 5/1992 | Matsuura | 501/15 |
| 5,749,932 A | * | 5/1998 | Lamar et al. | 65/135.7 |
| 5,786,659 A | * | 7/1998 | Takagi et al. | 313/309 |
| 5,831,387 A | * | 11/1998 | Kaneko et al. | 313/495 |
| 2002/0092356 A1 | * | 7/2002 | Yamamoto et al. | 73/754 |

OTHER PUBLICATIONS

Sabadel et al, Structural and Nonlinear Optical Characterizations of TelluriumOxide based glasses, Journal of SOlid State Chemistry, 132(2): 411–419—1997.*

* cited by examiner

Primary Examiner—John Hoffman
(74) Attorney, Agent, or Firm—Peter V. D. Wilde

(57) ABSTRACT

The specification describes ceram-glass compositions useful for electro-optic devices. The compositions have active ferroelectric ingredients in a tellurium oxide host. Proper processing of the ceram-glass produces highly transparent material with desirable ferroelectric properties. The ceram-glass materials can be used for electro-optic devices in both bulk and thin film applications.

14 Claims, 3 Drawing Sheets

SRO + BAO + NB₂O₅ + TEO₂ CERAM-GLASS ELECTRO-OPTICAL DEVICE AND METHOD OF MAKING

FIELD OF THE INVENTION

This invention relates to electro-optic devices and to methods for their manufacture.

BACKGROUND OF THE INVENTION

Electro-optic devices, e.g. modulators, are essential components of most lightwave systems. Typically, these devices use lithium niobate as the active electro-optic material. In state of the art commercial systems, electro-optic devices are digital and operate with data transmission rates up to 10 Gbits. Systems under development reach data rates of 40 Gbits and higher.

Lithium niobate is widely used in electro-optic applications largely because techniques have been developed for making large crystals of this material. Other ceramic ferroelectric materials, such as barium titanate and strontium barium niobate, have potentially superior ferroelectric properties but these materials are difficult to produce in large, optical quality, crystals. Moreover, in single crystal form, these alternative materials exhibit undesirable photorefractive properties.

Thus commercial electro-optics devices continue to be made using bulk crystals of lithium niobate. However, bulk devices are expensive to manufacture, especially with very small dimensions, are difficult to integrate, and typically operate with relatively high drive voltages. High drive voltages currently limit practical implementation of ultra high bit rate modulators. New device designs, with lower manufacturing cost and reduced drive voltages, are critical to the continued development and large-scale commercial application of these modulators. Especially attractive from these standpoints, are devices made in thin film form. However, to date, the availability of efficient ferroelectric materials that can be fabricated using thin film techniques is limited.

New ferroelectric materials that meet these needs would constitute a significant advance in the technology.

Attempts have been made recently to develop new material systems called ceram-glass. In these materials a glass is used as a host for a ferroelectric ceramic. If the ferroelectric component of the material system is be made with small enough crystal grain size, a transparent body can result. However, engineering such a system is complicated by the fact that most ceramics form multiple phases, and creating a uniform, stable and reproducible phase with the right ferroelectric properties is elusive. Moreover, the optical properties of the host material, especially the refractive index, must match those of the ferroelectric phase. From a practical standpoint this eliminates the silica glasses from consideration.

Due to the foregoing difficulties, the development of new ceram-glass materials has met with limited success.

STATEMENT OF THE INVENTION

We have developed new ferroelectric ceram-glass materials that can be produced using thin film technology, and also show promise for bulk glass applications, especially optical fibers. The new materials comprise strontium barium niobate (SBN) in a host glass comprising tellurium dioxide. When properly processed, these material can be made highly transparent. Importantly, the ferroelectric phase in this system is thermodynamically favored, since the strontium-barium-niobium constituents prefer to form as oxides rather than tellurides. It has been demonstrated that, with proper processing, the ferroelectric constituents precipitate out as oxides with a very fine grain structure. These materials can be sputtered conveniently to form thin film devices, and can also be made in bulk form for other applications, notably, optical fibers.

The ceram-glass compositions useful for the invention can be expressed as:

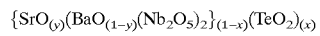

where $y=0.5–0.8$, and $x=0.4–0.9$.

DETAILED DESCRIPTION

Figure 1:
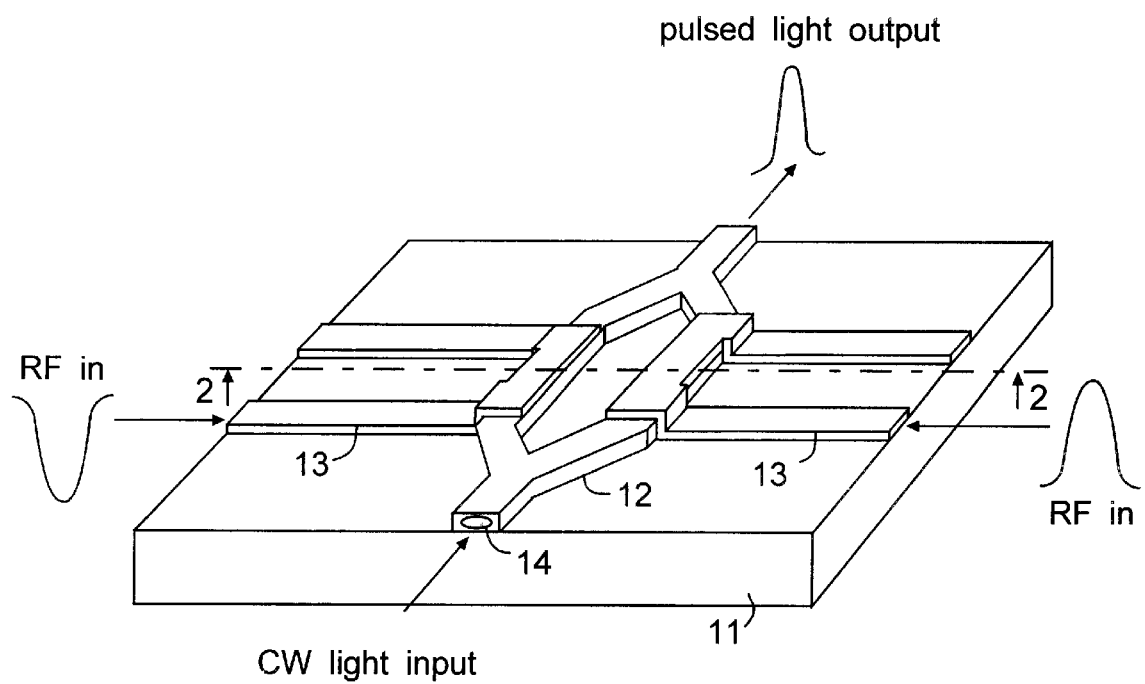
FIG. 1 is a schematic representation of an electro-optic modulator.

FIG. 1 shows an electro-optic modulator which is given by way of example of many devices that may utilize the electro-optic materials of the invention. In FIG. 1, substrate 11 is shown with ceram-glass active electro-optic layer 12. The substrate 11 may be any convenient planar support material, e.g. silica glass, ceramic, etc. Preferably the thermo-mechanical properties, especially the coefficient of thermal expansion of the substrate, approximate those of the ferroelectric ceram-glass material of the invention. A preferred choice which commercially available, is stable and normally highly planar, and has a well developed processing technology, is silicon. If electrical isolation is needed, a thin silicon dioxide layer (FIG. 2) can be deposited or grown on the silicon substrate. Other substrate materials may also be suitable, e.g., strontium titanate, lithium niobate, lithium tantalate, gallium arsenide, indium phosphide.

It will be evident to those skilled in the art that the electro-optic material may also be used in bulk form, with waveguides made by selective diffusion or implantation of an index modifying ion. However, the thin film form of the electro-optic device is used to illustrate one of the advantages of using the ceram- glass material of the invention. Referring again to FIG. 1, the waveguide 12 is selected from the category of ceram-glass materials of the invention. A continuous wave optical input is represented by 14. The waveguide 12 is split to form two active interaction regions as shown. The strip electrodes 13 overlie the interactive electro-optic regions. By impressing opposite phased voltages in the two striplines, as schematically represented by the RF inputs in FIG. 1, the continuous wave optic input in each of the two arms can be made to be phase matched or unmatched when the two arms are recombined. The split optical signal, when recombined, is either enhanced or extinguished resulting in a pulsed optical output with a frequency determined by the RF input signals. These electro-optic modulators are well known in the art. For more details, see Ivan P. Kaminlow and Thomas L. Koch, Optical Fiber Telecommunications IIIB, San Diego, Calif.: Academic Press, 1997, ch. 9, which, for those details, is incorporated herein by reference.

Figure 2:
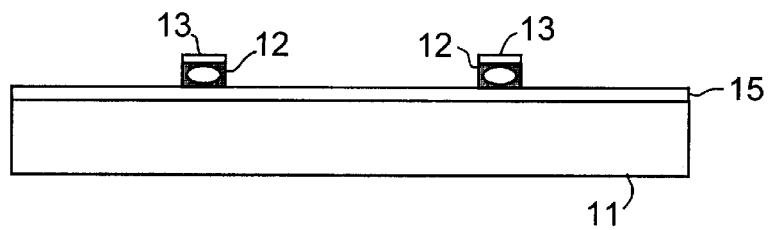
FIG. 2 is a section view along 2—2 of FIG. 1 showing the ceram-glass waveguide.

A cross section of the active regions of the device of FIG. 1, i.e. the regions where the electric and optic fields overlap, is shown in more detail in FIG. 2, which is a section view along 2—2 of FIG. 1. The ceram-glass waveguides 12 are shown with drive electrodes 13. A silicon dioxide barrier layer is shown at 15. Typical dimensions for the drive electrodes are:

thickness: 5–20 μm width of stripline: 5–20 μm thickness of barrier layer: 0.1–0.5 μm The distance separating the waveguides is controlled by the desire to minimize the waveguide angles, and keep the overall footprint small. The material of the drive electrodes is preferably gold, although other materials may also be used.

Techniques for processing optical integrated circuits (OICs) with electro-optic components are conventional and do not require specific exposition here in order to practice the invention. For example, methods for depositing and etching the barrier layer, techniques for depositing and lithographically patterning the electrode layer, etc., are not part of the invention described above but may be specified as general operations to give context for the steps of the invention.

The strontium-barium-niobium (SBN)/$TeO_2$ compositions that form the basis for the invention are defined as follows:

| Constituent | mol % |
|---|---|
| SrO | 2–15 |
| BaO | 1–10 |
| $Nb_2O_5$ | 7–40 |
| $TeO_2$ | 40–90 |
| $TiO_2$ | 0–20 |

The materials are processed by preparing fine powders of the constituents, mixing them thoroughly, heating to melting temperature, then quenching. The melting point of these compositions is typically in the range 700° C.–1300° C. The quench time should generally be less than a minute and preferably less than 15 sec., i.e. the rate is preferably at least 100° C. per second. The quenched material is essentially amorphous. The quenched mixture is then annealed to precipitate fine grains of SBN oxide to constitute the active ferroelectric phase. With proper processing the SBN oxide grain size is smaller than the wavelength of the optical signal typically used, i.e. less than 1.3 or 1.55 microns, so that the resulting material is transparent to these wavelengths. The recommended precipitation anneal is 15 min. to 5 hours at a temperature greater than 50° C. below the glass transition temperature $T_g$. The $T_g$ values for the compositions of the invention are typically in the range 375–550° C. To prevent water contamination, which degrades the electro-optic properties of the materials, it is preferred that the entire process be conducted in a controlled environment with water content less than 1 ppm.

The following Table gives examples of the compositions of the invention that were prepared by the foregoing process.

TABLE

| Sample # | mol % SrO | mol % BaO | mol % $Nb_2O_5$ | mol % $TeO_2$ | mol % $TiO_2$ |
|---|---|---|---|---|---|
| 1 | 7.5 | 2.5 | 20 | 70 | 0 |
| 2 | 5.6 | 3.7 | 18.7 | 72 | 0 |
| 3 | 4 | 2.7 | 13.3 | 80 | 0 |
| 4 | 3.8 | 2.6 | 16.7 | 76.9 | 0 |
| 5 | 4 | 2.7 | 13.3 | 80 | 0 |
| 6 | 6 | 4 | 20 | 70 | 0 |
| 7 | 3.8 | 2.6 | 16.7 | 76.9 | 0 |
| 8 | 5 | 3.3 | 16.7 | 75 | 0 |
| 9 | 4 | 2.7 | 13.3 | 79 | 1 |
| 10 | 5 | 3.3 | 16.7 | 73 | 2 |
| 11 | 7 | 4.7 | 23.3 | 65 | 0 |
| 12 | 8 | 5.4 | 26.6 | 60 | 0 |
| 13 | 3 | 9.5 | 10 | 70 | 7.5 |
| 14 | 3 | 12 | 10 | 65 | 10 |
| 15 | 4 | 6 | 20 | 70 | 0 |

Thin films of these materials were examined using x-ray diffraction and calorimetry, and light scattering measurements were taken, all of which confirmed both the ferroelectric properties of the films, and their transparency.

For thin film applications, the ceram-glass thin film layer of the invention is preferably formed by sputtering. The sputtering target is preferably a composite target using mixed oxides of the constituents given in the Table.

In a typical sputtering embodiment the target pieces are mounted on standard Cu backing plates of Planar RF Magnetron sputtering cathodes. The target can be used with any type of sputtering source such as diode, triode, and various types of magnetrons. In the embodiment described here, a planar magnetron is used. An air or oxygen atmosphere is suitable. Deposition pressure is determined by the apparatus, and the type of sputtering source. Using a planar magnetron, typical pressures can be in the range 3–6 mTorr.

Deposition is carried out by RF sputtering. RF power varies with the application, the desired film properties and the deposition rate. For thin films slow deposition rates may be preferred in order to obtain better thickness control. RF power densities up to 100 W/$in^2$ are typical.

Figure 3:
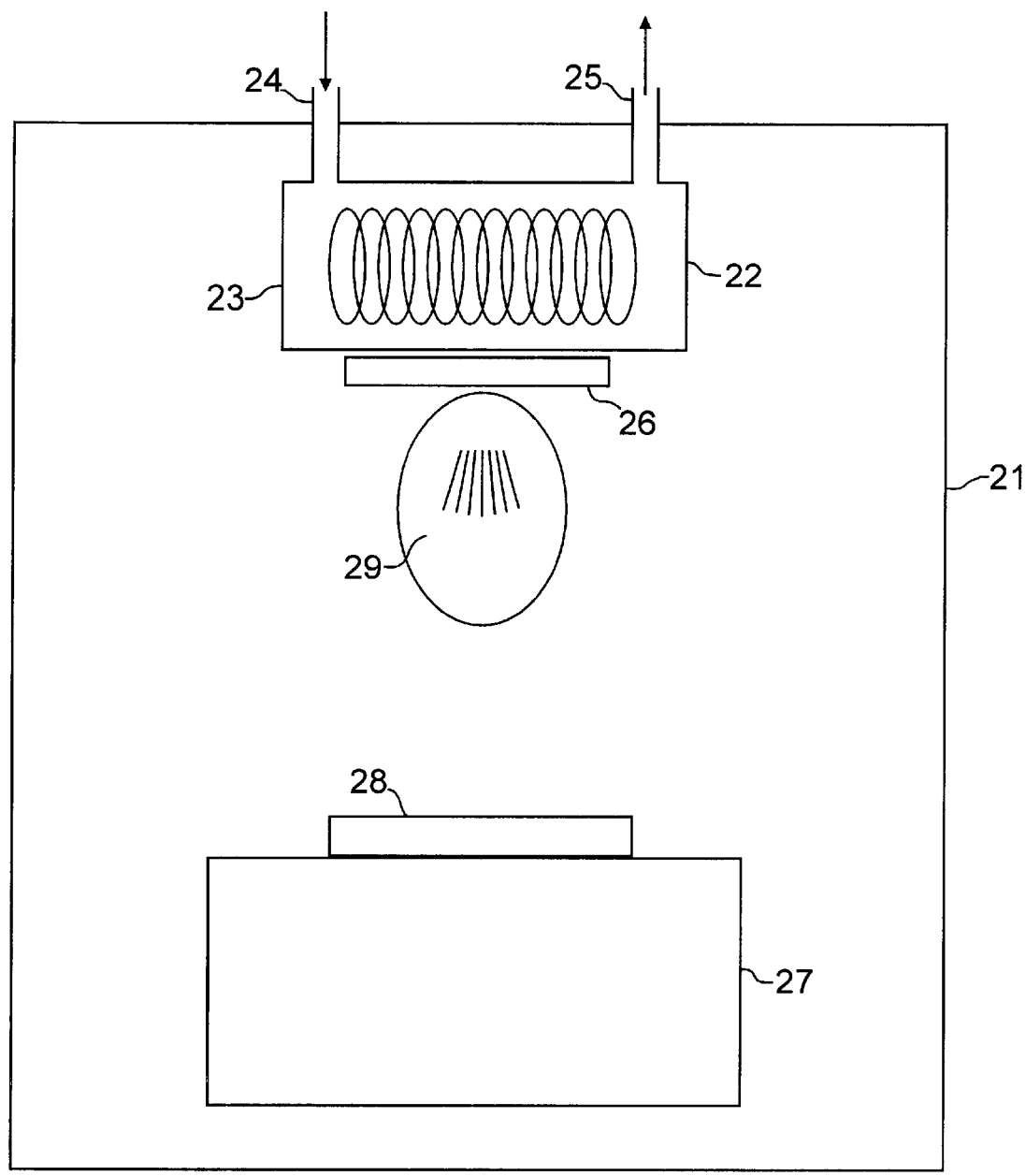
FIG. 3 is a schematic view of a sputtering apparatus useful for forming thin film ceram-glass layers for electro-optic devices such as that shown in FIGS. 1 and 2.

A suitable sputtering apparatus of the kind just described is shown in FIG. 3. FIG. 3 is a schematic representation of a magnetron sputtering apparatus with vacuum chamber 21 enclosing the sputtering source and the substrate to be coated. The source comprises a permanent ring magnet, shown here schematically as magnet 23, enclosed within housing 22. The housing is typically of a conductive material such as OFHC copper, and is water cooled via inlet and outlet 24 and 25. The target 26 is attached to the other side of the magnet assembly as shown. The substrate 28 is shown supported by platform 27. The plasma is indicated schematically at 29. The size of the target, size of the substrate being coated, and distance between the target and substrate should be chosen so that the substrate is exposed to the flux of sputtered material from the target. With the proper choice of these parameters the sputtered layer will be highly uniform. For large areas, uniformity can be improved by proper design of the source. For example, multiple ring magnets can be used to create multiple erosion rings across the area of the target.

Under typical sputtering conditions, only the atoms at the surface layer of the target are ejected and therefore differentiation of the bulk material (which is characteristic of evaporation processes) does not occur. This makes sputtering preferred over evaporation as a technique for depositing the ceram-glass films of the invention.

When a material is sputtered from a composite target it is advantageous for the particles in the target to be small. Using the process described above, the ferroelectric crystals are very fine, producing an ideal target for sputtering uniform films.

The mixed oxides used in the process described earlier can be included in the initial mixtures as carbonates or other alternative precursor materials to give essentially equivalent results.

Figure 4:
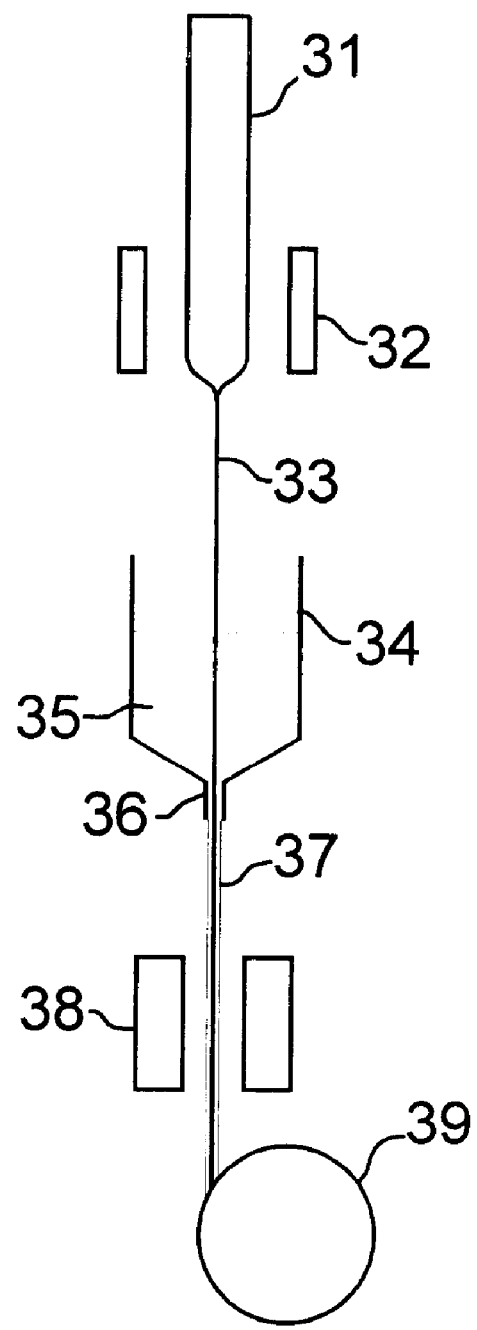
FIG. 4 is a schematic representation of a fiber draw apparatus.

As suggested earlier, the electro-optic materials described herein are well adapted for making active optical fibers, i.e. fiber sections that are useful for example as optical modulators. The fiber preform is prepared following the procedure described above. The optical fiber is drawn from the preform, in the conventional manner, by heating a portion of the preform to the softening point, and drawing the glass fiber filament vertically in a fiber draw tower. The nascent surface of the fiber is coated with a standard polymer. Standard fiber draw equipment can be used to implement this aspect of the invention. FIG. 4 gives a schematic representation of a fiber draw apparatus. Optical fiber ceram-glass preform 31 is shown with susceptor 32 representing the furnace (not shown) used to soften the glass preform and initiate fiber draw. The drawn SBN/TeO$_2$ fiber is shown at 33. The nascent fiber surface is then passed through coating cup 34 which contains the coating material prepolymer 35. The liquid coated fiber then exits from the cup 34 through exit die 36, which aids in maintaining the desired coating thickness. The prepolymer coated fiber 37 is then exposed to UV lamps 38, or whatever curing radiation is appropriate for the particular coating materials used, to cure the prepolymer and complete the coating process. The fiber, with the coating cured, is then taken up by take-up reel 39. The take-up reel controls the draw speed of the fiber. Draw speeds in the range typically of 0.1–50 m/sec. can be used. It is important that the fiber be centered within the coating cup and the exit die 36 to maintain concentricity of the fiber and coating. A commercial apparatus typically has pulleys that control the vertical alignment of the fiber. Hydrodynamic pressures in the die itself aid in centering the fiber. A stepper motor, controlled by a micro-step indexer, controls the take-up reel.

Coating materials for optical fibers are typically urethanes, acrylates, or urethane-acrylates, with a UV photoinitiator added. For a dual coated fiber, typical primary or inner coating materials are soft low modulus materials such as silicone, hot melt wax, or any of a number of polymer materials having a relatively low modulus. Typical materials for the second or outer coating are high modulus (3000–5000 cp) polymers, typically urethanes or acrylics. In practice both materials may be low and high modulus acrylic. The coating thickness typically ranges from 150–300 μm in diameter, with approximately 240 μm standard.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A process for making a ceram-glass electro-optic material comprising the steps of:

(a) mixing together the following ingredients:

| | |
|---|---|
| SrO | 2–15 mol % |
| BaO | 1–10 mol % |
| Nb$_2$O$_5$ | 7–40 mol % |
| TeO$_2$ | 40–90 mol % |
| TiO$_2$ | 0–20 mol % | to produce a mixture of oxides,
    (b) melting the mixture of oxides to produce a molten mixture,
    (c) quenching the molten mixture to produce a ceram-glass body,
    (d) annealing the ceram-glass body for at least fifteen minutes at a temperature of at least 50° C. below the glass transition temperature of the ceram-glass.

2. The method of claim 1 in which the ceram-glass body is annealed in an oxygen containing atmosphere.

3. The method of claim 2 in which the ceram-glass body is annealed in air.

4. The method of claim 1 in which the ceram-glass body is annealed in an atmosphere containing less than 1 ppm water.

5. A method for making an electro-optic device comprising the step of forming a waveguide having the composition:

$$\{SrO_{(y)}(BaO_{(1-y)}(Nb_2O_5)_2\}_{(1-x)}(TeO_2)_{(x)}$$

y=0.5–0.8, and x=0.4–0.9.

6. The method of claim 5 wherein the waveguide is formed by:

(a) depositing a thin film layer of the said composition on a substrate,
    (b) patterning the thin film layer to form an optical waveguide,
    (c) providing electrode means for impressing a voltage on the optical waveguide.

7. The method of claim 6 wherein the thin film layer of electro-optic material is deposited by sputtering.

8. A method for making an electro-optic device comprising:

(a) depositing a thin film layer of electro-optic material on a substrate by the steps comprising:
        (i) mixing together the following ingredients:

| | |
|---|---|
| SrO | 2–15 mol % |
| BaO | 1–10 mol % |
| Nb$_2$O$_5$ | 7–40 mol % |
| TeO$_2$ | 40–90 mol % |
| TiO$_2$ | 0–20 mol % | to produce a mixture of oxides,
        (ii) melting the mixture of oxides to produce a molten mixture,
        (iii) quenching the molten mixture to produce a ceram-glass body,
        (iv) annealing the ceram-glass body for at least fifteen minutes at a temperature of at least 50° C. below the glass transition temperature of the ceram-glass.
    (b) patterning the thin film layer to form an optical waveguide,
    (c) providing electrode means for impressing a voltage on the optical waveguide.

9. The process of claim 8 wherein the mixture of oxides further includes up to 20 mol % of TiO$_2$.

10. The method of claim 8 wherein the thin film layer is deposited by sputtering.

11. An electro-optic device comprising:
(a) a substrate,
(b) an optical waveguide formed on the substrate,
(c) an electrode formed on the optical waveguide, and
(d) means for impressing a voltage on the electrode, the electro-optic device characterized in that the optical waveguide comprises the composition:

$$\{SrO_{(y)}(BaO_{(1-y)}(Nb_2O_5)_2\}_{(1-x)}(TeO_2)_{(x)}$$

where y=0.5–0.8, and x=0.4–0.9.

12. The electro-optic device of claim 11 herein the composition further includes up to 20 mol % of $TiO_2$.

13. A method for the manufacture of optical fiber comprising the steps of:
(a) forming an optical fiber preform by the steps comprising:
(i) mixing together the following ingredients:

| | |
|---|---|
| SrO | 2–15 mol % |
| BaO | 1–10 mol % |
| $Nb_2O_5$ | 7–40 mol % |
| $TeO_2$ | 40–90 mol % |
| $TiO_2$ | 0–20 mol % | to produce a mixture of oxides,
(ii) melting the mixture of oxides to produce a molten mixture,
(iii) quenching the molten mixture to produce a ceram-glass body,
(iv) annealing the ceram-glass body for at least fifteen minutes at a temperature of at least 50° C. below the glass transition temperature of the ceram-glass.
(b) heating the preform,
(c) drawing an optical fiber from the preform.

14. An optical fiber comprising the composition:

$$\{SrO_{(y)}(BaO_{(1-y)}(Nb_2O_5)_2\}_{(1-x)}(TeO_2)_{(x)}$$

where y=0.5–0.8, and x=0.4–0.9.

* * * * *